Jan. 8, 1952          H. J. MUMMA          2,581,693
QUICK CHANGE SIZER COUNTER SWITCH MOUNTING
Filed Sept. 24, 1949          4 Sheets-Sheet 1

INVENTOR
HAROLD J. MUMMA

BY *Hans G. Hoffmeister*

ATTORNEY

Jan. 8, 1952  H. J. MUMMA  2,581,693
QUICK CHANGE SIZER COUNTER SWITCH MOUNTING
Filed Sept. 24, 1949  4 Sheets-Sheet 2

INVENTOR
HAROLD J. MUMMA
BY Hans G. Hoffmeister
ATTORNEY

Jan. 8, 1952 H. J. MUMMA 2,581,693
QUICK CHANGE SIZER COUNTER SWITCH MOUNTING
Filed Sept. 24, 1949 4 Sheets-Sheet 3

INVENTOR
HAROLD J. MUMMA
BY Hans G. Hoffmeister
ATTORNEY

Jan. 8, 1952     H. J. MUMMA     2,581,693
QUICK CHANGE SIZER COUNTER SWITCH MOUNTING
Filed Sept. 24, 1949     4 Sheets-Sheet 4
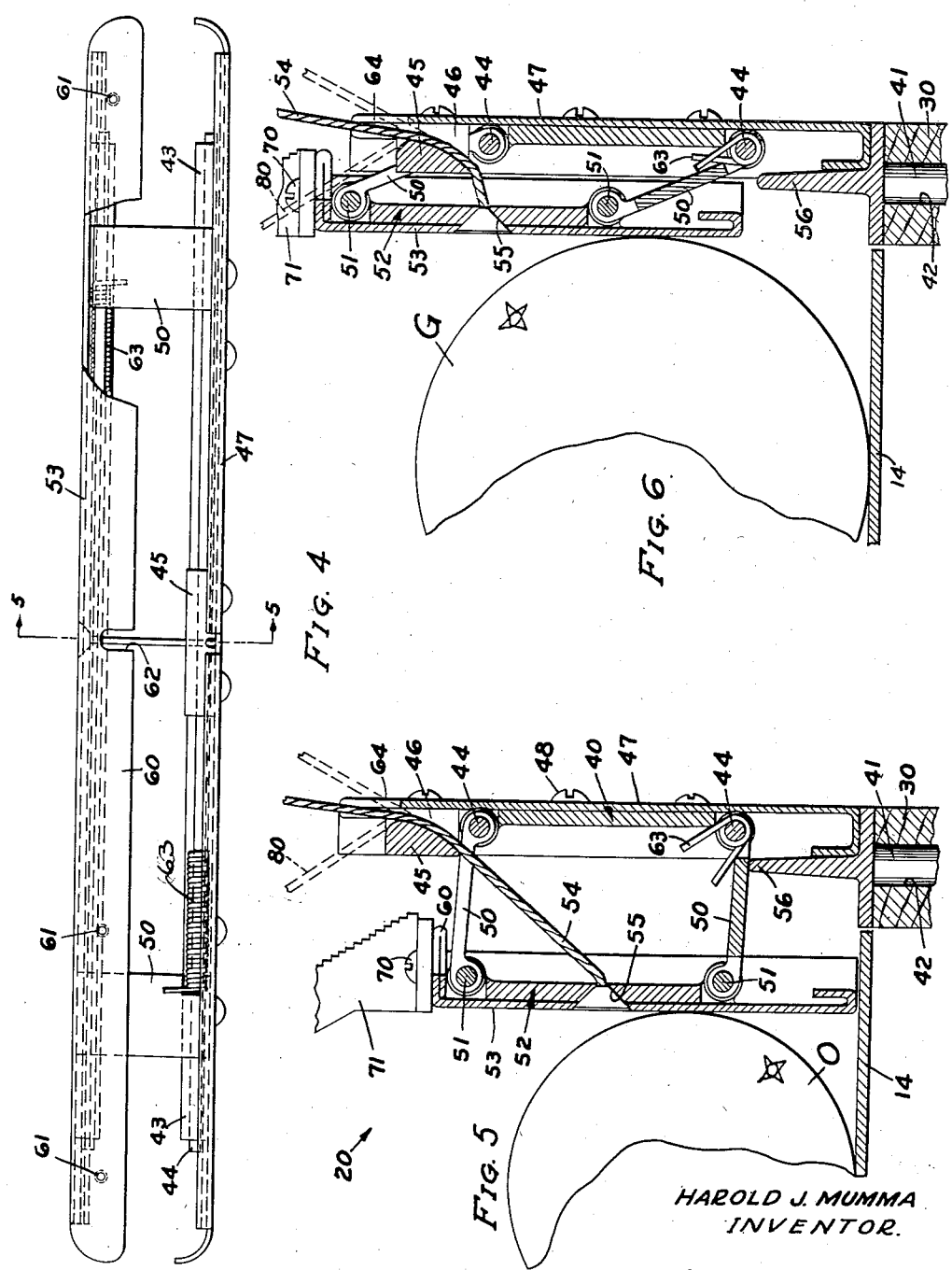
HAROLD J. MUMMA
INVENTOR.
BY Hans G. Hoffmeister
ATTORNEY Patented Jan. 8, 1952

2,581,693

UNITED STATES PATENT OFFICE 2,581,693

QUICK-CHANGE SIZER COUNTER SWITCH MOUNTING

Harold J. Mumma, Riverside, Calif., assignor to Food Machinery and Chemical Corporation, San Jose, Calif., a corporation of Delaware Application September 24, 1949, Serial No. 117,658

7 Claims. (Cl. 235—98)

1

This invention relates to the fruit packing industry and is especially useful on a fruit sizer which is adapted for sizing different kinds of fruit such as oranges and grapefruit which differ considerably in average diameter, and in which it is desired to count the individual pieces of fruit passing through said sizer.

In packing houses handling both oranges and grapefruit, and in which both of these fruits must be sized before packing them in shipping boxes, it is necessary to use the same sizers for sizing the oranges and the grapefruit. The marked difference in average diameter of these two kinds of fruit makes it necessary, when switching from one of these fruits to the other, to change all the sizing openings of the sizer. Since it may be necessary, in such houses, to change from handling oranges to handling grapefruit and vice versa several times a day, it has become important to reduce to a minimum the time required for making these sizing opening adjustments, and unitary controls have been devised which have largely solved this problem.

To assist in keeping books on the proportion of each farmer's lot of fruit which is of each packing size, sizers have been equipped with counters for counting the number of pieces of fruit of each size into which a farmer's lot is divided by the sizer. For accuracy in thus counting the fruit, electric switches contacting the individual pieces of fruit are mounted on arms which swing up and down, each arm being lifted by a piece of fruit as the switch on said arm is actuated by said piece of fruit to count the latter. Because said arms must be relatively short to accomplish their function, they must be disposed at a different height above a fruit runway when counting oranges than they are disposed when counting grapefruit.

It has also been found desirable, if not necessary, to have these switch arms located so that the arms will be engaged by the highest point on the fruit at the moment the switch is actuated by the latter. This makes it desirable to guide the fruit as it passes under the switch arm so that it will be approximately in alignment therewith. These guides are on opposite sides of the switch arm and naturally must be closer together for guiding oranges than for guiding grapefruit. Another reason why adjustment of these guides is necessary is that guides far enough apart to handle grapefruit might allow two oranges to pass underneath the switch arm abreast of each other, in which case the two oranges would merely be counted as one.

2

It is an object of the present invention to provide a mechanism whereby the adjustment of the mountings for the counter switch arms and the positioning of the guides for the fruit in a quick change sizer may be quickly made in changing from the handling of one kind of fruit to the handling of a different kind of fruit.

The manner of accomplishing the foregoing object as well as further objects and advantages will be made manifest in the following description taken in connection with the accompanying drawings in which Fig. 1 is a perspective of a sizer having two view units of a preferred embodiment of the invention mounted thereon, and with said units adjusted for handling oranges.

Fig. 4 is a plan view of a guide wall of the invention with the switch arm mount removed therefrom and showing said wall in an expanded condition, as when handling oranges.

Fig. 5 is an enlarged cross sectional view taken on the line 5—5 of Fig. 4 and illustrating the cable control for said guide wall and the manner in which the switch arm mount is secured thereon.

Fig. 6 is a view similar to Fig. 5 and illustrates said wall in collapsed condition, as when handling grapefruit.

Figure 1:
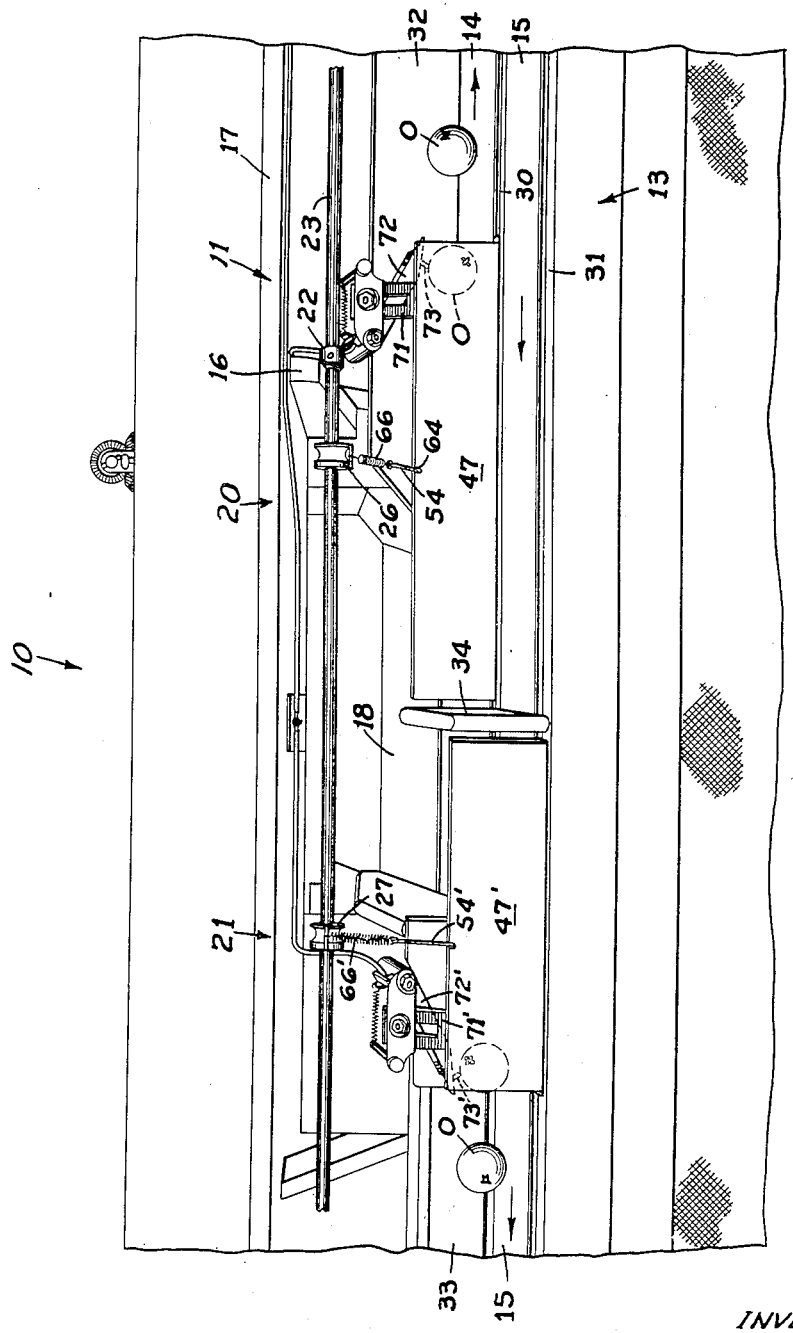

Referring specifically to the drawings, my invention is illustrated therein as installed in a sizer 10 having a frame 11 including a central structure 12 supporting a conveyor base 13 over which conveyor belts 14 and 15 travel in opposite directions as indicated by the arrows in Fig. 1. The structure 12 also has arms 16 which extend outwardly to support a platform 17 which overlies the conveyors 14 and 15.

Supported on the structure 12 and not shown in the drawings is a sizing mechanism for sizing either oranges or grapefruit and quickly changeable in adjustment to handle either one of these two kinds of fruit. The fruit is discharged from the sizing mechanism onto a sloping cushioned board 18 (Fig. 1) from which the fruit rolls onto the conveyor belts 14 and 15.

As above pointed out, the present invention has to do with counting the fruit after it has been delivered onto one or the other of these two belts. It may be noted here that after fruit has been thus counted, it drops downwardly from the conveyor base 13 into fruit receiving bins which are disposed towards the observer from the near edge of said conveyor base.

Figure 2:
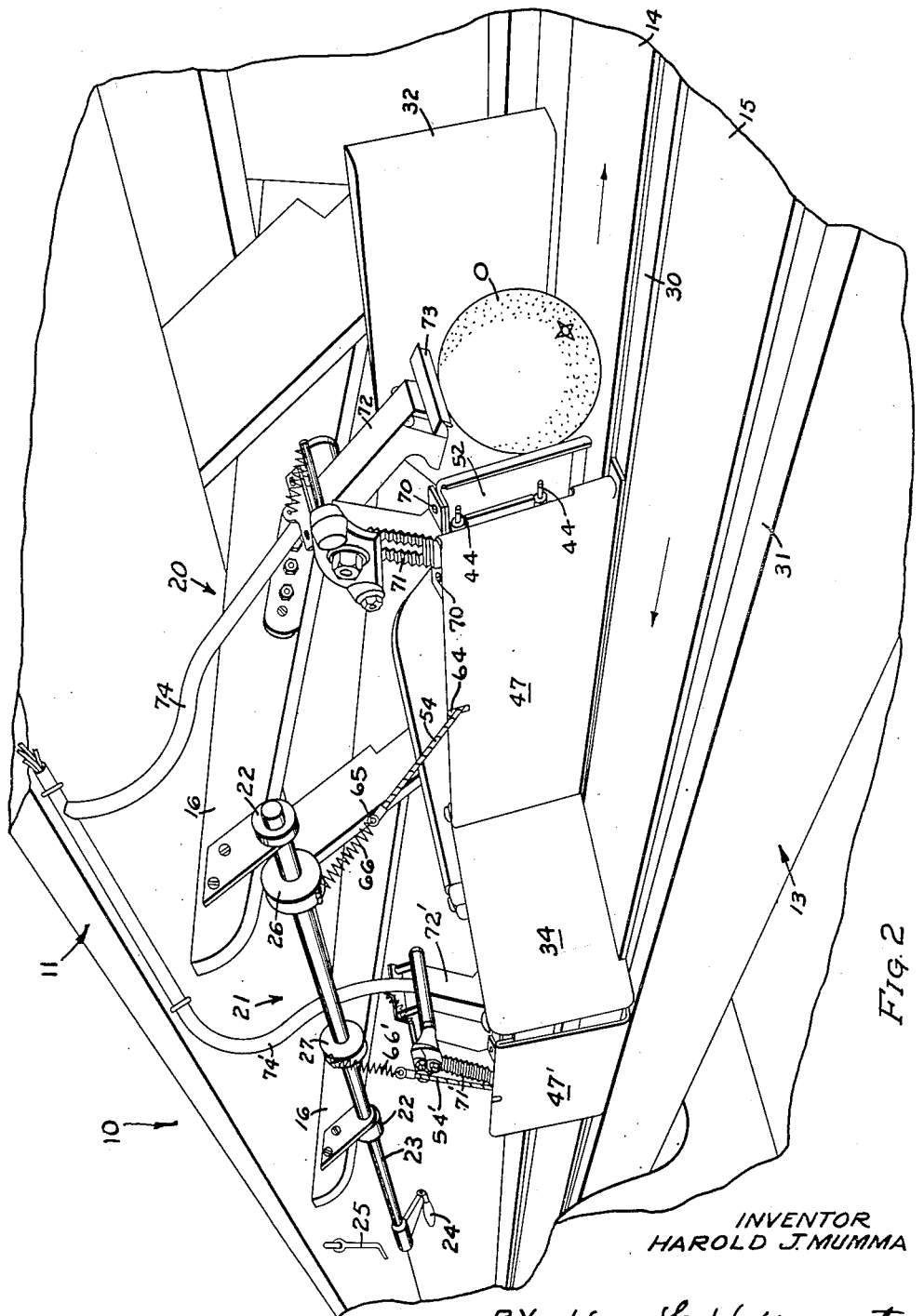
Fig. 2 is a perspective view of said units from a three-quarter angle with the same adjustment.
Figure 3:
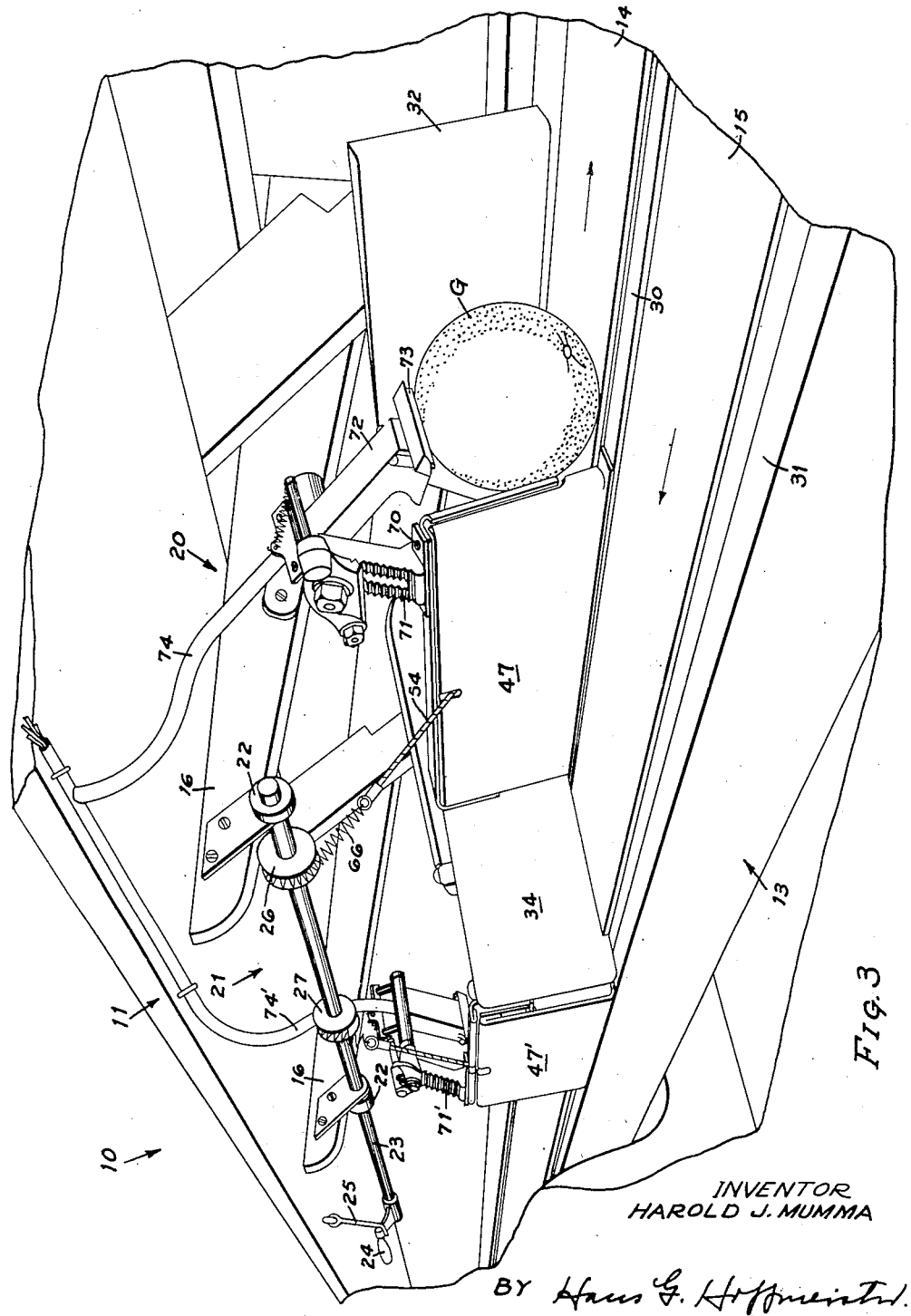
Fig. 3 is a view similar to Fig. 2 and shows the invention adjusted for the handling of grapefruit.

The units 20 and 21 of the apparatus of the invention are shown in Figs. 1, 2, and 3, unit 20 being located over conveyor belt 14, while unit 21 is located over belt 15. These units are identical in construction excepting that unit 20 is slightly longer than unit 21.

Journalled in bearings 22 provided on the frame arms 16 is a control shaft 23. This shaft has fixed thereon a crank 24 which is adapted to be held in the position in which it is shown in Fig. 3 by a hook 25. Also fixed on the shaft 23 are spools 26 and 27.

The units 20 and 21 being identical in construction, excepting for their difference in length, a description for unit 20 will suffice for both. This unit is mounted on a board 30 which is disposed between the belts 14 and 15 and is part of the base 13. The unit 21 is mounted in a similar manner on the front board 31 of the base 13 which lies just below the belt 15. Across the belt 14 from the unit 20 is provided a guide board 32. Across the belt 15 from the unit 21 is provided a guide board 33. Mounted on the boards 30 and 31 between units 20 and 21 is a short vertical board 34.

Referring now to Figs. 4, 5, and 6, it is noted that the unit 20 includes an upright wall member 40 which is rigidly mounted on the base board 30 by studs 41 provided on the member 40 and extending downwardly into suitable holes 42 provided in base board 30.

Wall member 40 has bearings 43 carrying shafts 44. Member 40 also has a boss 45 having a rounded cable passage 46 formed therein while a cover plate 47 is applied by screws 48 to the member 40. Pivotally supported on the shafts 44 are links 50 the outer ends of which are pivotally connected by shafts 51 to a guide wall 52 which is provided with a sheet metal face or cover plate 53 and has a cable 54 anchored in a tapered hole 55 provided therein.

The lower pair of links 50 rest on a shoulder 56 provided on the wall member 40 so as to support the guide wall 52 with its lower edge closely spaced above the conveyor belt 14 when this guide wall is in an expanded position as shown in Figs. 1, 2, 4, and 5.

Extending inward from the upper edge of cover plate 53 of guide wall 52 is a rebent flange 60 having pairs of holes 61 (Fig. 4) adjacent opposite ends thereof and a notch 62 in the vertical plane of cable 54 for accommodating the latter when the invention is positioned over belt 15 like unit 21. Coil springs 63 are provided on the shafts 44 and 51 to bias the wall 52 into its outward, lowered position as shown in Fig. 5.

The cable 54 of the unit 20 extends outwardly through a slot 64 in the upper edge of the cover plate 47, the outer end of this cable having an eye 65 which connects to a coil spring 66, the opposite end of which hooks into an eye 67 provided on the spool 26.

Fixed on the upper edge of the guide wall 52 by screws 70 extending downwardly therethrough into a pair of the tapped holes 61, is a switch arm mount 71 carrying a switch arm 72 with the latter pivotally supported on said mount on an axis which is substantially parallel with the conveyor belt 14 which means that this axis is inclined slightly relative to horizontal.

The switch arm 72 may be of any preferred type well known in the art such as that shown in the U. S. Letters Patent to Frank Ahlburg No. 2,089,936 issued August 17, 1937, on a Fruit Counter. This arm embodies a switch (not shown) which is actuated by a finger 73 which is engaged by each piece of fruit as it passes under and lifts the arm 72 to allow the fruit to pass thereunder. This switch is connected through electric conductors carried in a cable 74 with an electric circuit including a counter so that the total of all the individual pieces of fruit thus passing under the switch arm 72 and actuating the switch therein by engaging the finger 73 is shown by said counter.

Structural elements of unit 21 may be referred to by using the same numerals as are applied to corresponding elements in unit 20, with prime attached.

Unit 21 has a slightly different position with reference to the shaft 23 by virtue of the fact that unit 21 is mounted on base board 31 which is disposed outwardly from under the shaft 23 whereas unit 20 is mounted in base board 30 which is disposed inwardly from under shaft 23. The difference between the positions in which these two units are mounted causes the cables 54 and 54' to extend from these units in different directions so that cable 54' extends from unit 21 so as to pass around the curved guide surface provided in passage 46' in boss 45' as clearly shown by the broken lines 80 in Figs. 5 and 6.

Operation

In the operation of sizer 10, fruit of a certain size is discharged downwardly from the sizing mechanism onto board 18 from which the fruit gravitates onto the conveyor belts 14 and 15 which continuously travel in the direction of the arrows applied thereto in Fig. 1.

The board 34 being opposite the midpoint in board 18, the fruit is thus divided, part of it passing to the right along the belt 14 and the balance passing to the left along belt 15. The pieces of fruit are thus individually counted as they successively engage the fingers 73 and 73' of the switch arms 72 and 72' of the two units.

As shown in Fig. 1 these units are conditioned for handling oranges O by the shaft 23 being free to rotate until the guide walls 52 and 52' are in expanded position as shown in Figs. 1, 2, 4, and 5. This lowering of the guide walls 52 and 52' of the members 40 and 40' lowers the switch arm mounts 71 and 71' and switch arms 72 and 72' so that the latter will be disposed at the proper elevation for operating on oranges. When changing from oranges to grapefruit, the shaft 22 is rotated as shown in Fig. 3 whereupon the springs 66 and 66' in the units 20 and 21 will collapse and lift guide walls 52 and 52' thereby also lifting switch arm supports 71 and 71' and the switch arms 72 and 72' carried thereon, whereby the latter will be disposed at the proper elevation for counting grapefruit G.

While only two units 20 and 21 embodying the invention are illustrated in the drawings, it is to be understood that this is only by way of illustration and that similar units are supplied at each opening through which fruit is discharged from the sizer 10. All of the units on one side of the sizer are controlled simultaneously as by a shaft 23, and where units are provided on both sides of the sizer the shafts 23 for controlling these may be connected for rotation together so that all the units can be controlled from a single point.

I claim:

1. In a device for counting fruit of two kinds, the average diameter of one of which differs considerably from that of the other, the combination of: a guide wall which is shiftable to vary the width of the path along which said fruit may travel; a switch arm; means for mounting said arm to swing up and down with said arm extending downwardly into said path, whereby said arm is engaged and elevated by fruit passing thereunder to count said fruit; manually operable means for shifting said guide wall to increase the width of said path so as to accommodate said larger diameter fruit; and means movably supporting said switch arm mounting means in such manner that upon actuation of said wall shifting means, said switch arm mounting means is elevated to properly position said switch arm for engaging and counting said larger diameter fruit.

2. A combination as in claim 1 in which said switch arm mounting means is supported on said guide wall and in which said means for shifting said wall to widen said path lifts said wall in shifting the latter to widen said path and thereby lifts said switch arm mounting means to properly position said switch arm for counting fruit of said larger diameter.

3. A combination as in claim 1 in which spring means is provided to return said guide wall, said switch arm mounting means and said switch arm to their original positions upon the relaxation of said shifting means.

4. In combination: a fixed vertical member; a vertical guide wall; vertically spaced parallel links connecting said guide wall and said member; a mount provided on said guide wall and extending upwardly therefrom; a switch arm pivotally mounted on said mount to swing up and down, said arm extending downwardly therefrom to be engaged by fruit travelling along a path bounded by said guide wall; and means for swinging said guide wall on said links to shift said guide wall upwardly and towards said member thereby transmitting a similar movement to said mount and said switch arm.

5. A combination as in claim 4 in which spring means is provided for swinging said guide wall, said mount and said switch arm outwardly from said member and downwardly upon the relaxation of said shifting means.

6. A combination as in claim 4 in which said shifting means comprises a cable attached to said guide wall and extending upwardly and towards said member; a cable guide on said member about which said cable is adapted to turn; and a spring operating to return said guide wall to its downward position with respect to said member when the tension of said cable is relaxed.

7. In combination: a series of units each comprising the combination recited in claim 4; an actuating shaft for actuating all of the guide wall shifting means of said units, the guide wall shifting means of the respective units comprising flexible elements extending upwardly toward the fixed members of said units, said elements being guided by said members and secured to said shaft so as to be wound up thereon or unwound therefrom as said shaft is turned whereby said guide wall shifting means of all of said units may be simultaneously actuated or relaxed, as desired.

HAROLD J. MUMMA.

REFERENCES CITED

The following references are of record in the file of this patent:

UNITED STATES PATENTS

| Number | Name | Date |
|---|---|---|
| 1,250,483 | Moore et al. | Dec. 18, 1917 |
| 1,967,732 | Ahlburg | July 24, 1934 |
| 2,212,507 | Brunhoelzl | Aug. 27, 1940 |